United States Patent
Fima et al.

(10) Patent No.: US 11,801,518 B1
(45) Date of Patent: Oct. 31, 2023

(54) NECTAR HARVESTING SYSTEMS AND METHODS

(71) Applicants: BEE-IO HOENY TECHNOLOGIES, LTD., Rehovot (IL); THE IP LAW FIRM OF GUY LEVI, LLC, Wyckoff, NJ (US)

(72) Inventors: Sharon Fima, Kfar Hanagid (IL); Lior Yedidya, Jerusalem (IL); Lena Birger, Netanya (IL)

(73) Assignee: BEE-IO Honey Technologies, Rehovot (IL)

( * ) Notice: Subject to any disclaimer, the term of this patent is extended or adjusted under 35 U.S.C. 154(b) by 0 days.

(21) Appl. No.: 17/767,297

(22) PCT Filed: Jan. 3, 2022

(86) PCT No.: PCT/US2022/011037
§ 371 (c)(1),
(2) Date: Apr. 7, 2022

(87) PCT Pub. No.: WO2022/147501
PCT Pub. Date: Jul. 7, 2022

Related U.S. Application Data

(60) Provisional application No. 63/133,575, filed on Jan. 4, 2021.

(51) Int. Cl.
*B04B 5/02* (2006.01)
*B04B 11/06* (2006.01)
*A23K 50/70* (2016.01)
*A23K 10/30* (2016.01)

(52) U.S. Cl.
CPC .............. *B04B 5/02* (2013.01); *A23K 10/30* (2016.05); *A23K 50/70* (2016.05); *B04B 11/06* (2013.01)

(58) Field of Classification Search
CPC .............................. A23K 10/30; B04B 11/06
USPC ........................................................ 426/442
See application file for complete search history.

(56) References Cited

U.S. PATENT DOCUMENTS

| | | | |
|---|---|---|---|
| 4,761,291 | A | 8/1988 | Neumann et al. |
| 5,248,480 | A | 9/1993 | Greenfield |
| 8,148,168 | B2 | 4/2012 | Gjerde et al. |
| 10,179,922 | B2 | 1/2019 | El-Shafie et al. |
| 10,578,900 | B2 | 9/2020 | Saul |
| 10,758,900 | B2 * | 9/2020 | Saul ........ C12Q 1/686 |

FOREIGN PATENT DOCUMENTS

CN    208346118 U  *  1/2019  ............ C11B 9/02

OTHER PUBLICATIONS

CN-208346118U—Machine Translation. (Year: 2018).*

* cited by examiner

*Primary Examiner* — Hamid R Badr
(74) *Attorney, Agent, or Firm* — Guy Levi; The IP Law Firm of Guy Levi, LLC

(57) ABSTRACT

The disclosure relates to methods, systems and compositions for use in the harvesting of nectar from plants or their portions. More specifically, the disclosure relates to systems, compositions and methods for semi-continuously harvesting nectar from plants or their portions having extrafloral nectaries (EFN) with augmented nectar production.

20 Claims, 2 Drawing Sheets

NECTAR HARVESTING SYSTEMS AND METHODS

CROSS REFERENCE TO RELATED APPLICATIONS

This patent application is a U.S. National Phase filing of commonly owned and PCT Application No. PCT/US22/011037, filed Jan. 3, 2022, which is based on and claims the benefit of the filing date of now expired U.S. Provisional Patent Application Ser. No. 63/133,575, filed Jan. 4, 2021, both which are incorporated herein by reference in their entirely.

BACKGROUND

The disclosure is directed to methods, systems and compositions for use in the harvesting of nectar from flowers. More specifically, the disclosure is directed to systems, compositions and methods for semi-continuously harvesting nectar from flowers having extrafloral nectaries (EFN), as well as other plant sources with augmented nectar production.

Nectar is an important reward offered to pollinators in angiosperms. The major sugars in nectar are the disaccharide sucrose and the hexose monosaccharides glucose and fructose. Floral nectar characteristics such as sugar composition, sucrose-hexose proportions, concentration, volume, time of nectar secretion and nectar dynamics are often related to the interaction of flowers and pollinators. Moreover, flowers adapted to attract specific pollinators although, all pollinators (e.g., bees, moths, hummingbirds, bats) will be able to utilize free-flowing nectar if it was available.

Further, nectar is used to feed bees in certain circumstances, to prevent starvation especially in hives that have suffered collapse, during periods of nectar scarcity (fall) and following honey harvesting. Similarly, it may be advantageous to have harvested nectar to attract hummingbirds to gardens.

While it may be possible to provide synthetic nectar compositions, it is advantageous, to provide harvested, naturally occurring nectar for example, to bees, to produce honey that has organoleptic properties that better simulate the natural product.

Therefore, the need exists for methods, systems and compositions for harvesting commercially viable amounts of nectar for further processing and use.

SUMMARY

Disclosed, in various implementations, are systems, compositions and methods harvesting nectar from flowers. In other implementations, provided herein are methods for semi-continuously harvesting nectar from flowers having extrafloral nectaries (EFN), as well as other plant sources with augmented nectar production.

In an exemplary implementation, provided herein is a method of extracting nectar from a plant, implemented in a system comprising: a plurality of plants or portions thereof, an extraction chamber, at least one substrate, an extractor, and at least one collection chamber, the method comprising: collecting the plurality of plants or their portions; positioning at least a portion of the collected plants or their portions within the at least one substrate inserting the at least one substrate into the extraction chamber for a predetermined period, wherein the extraction chamber is maintained at an equilibrium relative humidity of between about 75% and about 95% at 25° C.; removing the at least one substrate from the extraction chamber; coupling the at least one substrate to the at least one collection chamber; coupling the collection chamber to the extractor; spinning the extractor at a predetermined revolutions per minutes, configured to extract the nectar from the plants or their portions; and collecting the nectar in the collection chamber.

In another exemplary implementation, provided herein is a system for extracting nectar from a plant or a portion thereof, comprising: a plurality of plants or their portions; an extraction chamber; at least one substrate; an extractor; and at least one collection chamber

BRIEF DESCRIPTION OF THE FIGURES

For a better understanding of the systems, compositions and methods for semi-continuously harvesting nectar from flowers having extrafloral nectaries (EFN), as well as other plant sources with augmented nectar production, reference is made to the accompanying examples and figures, in which.

DETAILED DESCRIPTION

Provided herein are implementations of systems, compositions and methods for semi-continuously harvesting nectar from flowers having extrafloral nectaries (EFN), as well as other plant sources with augmented nectar production.

Figure 1:
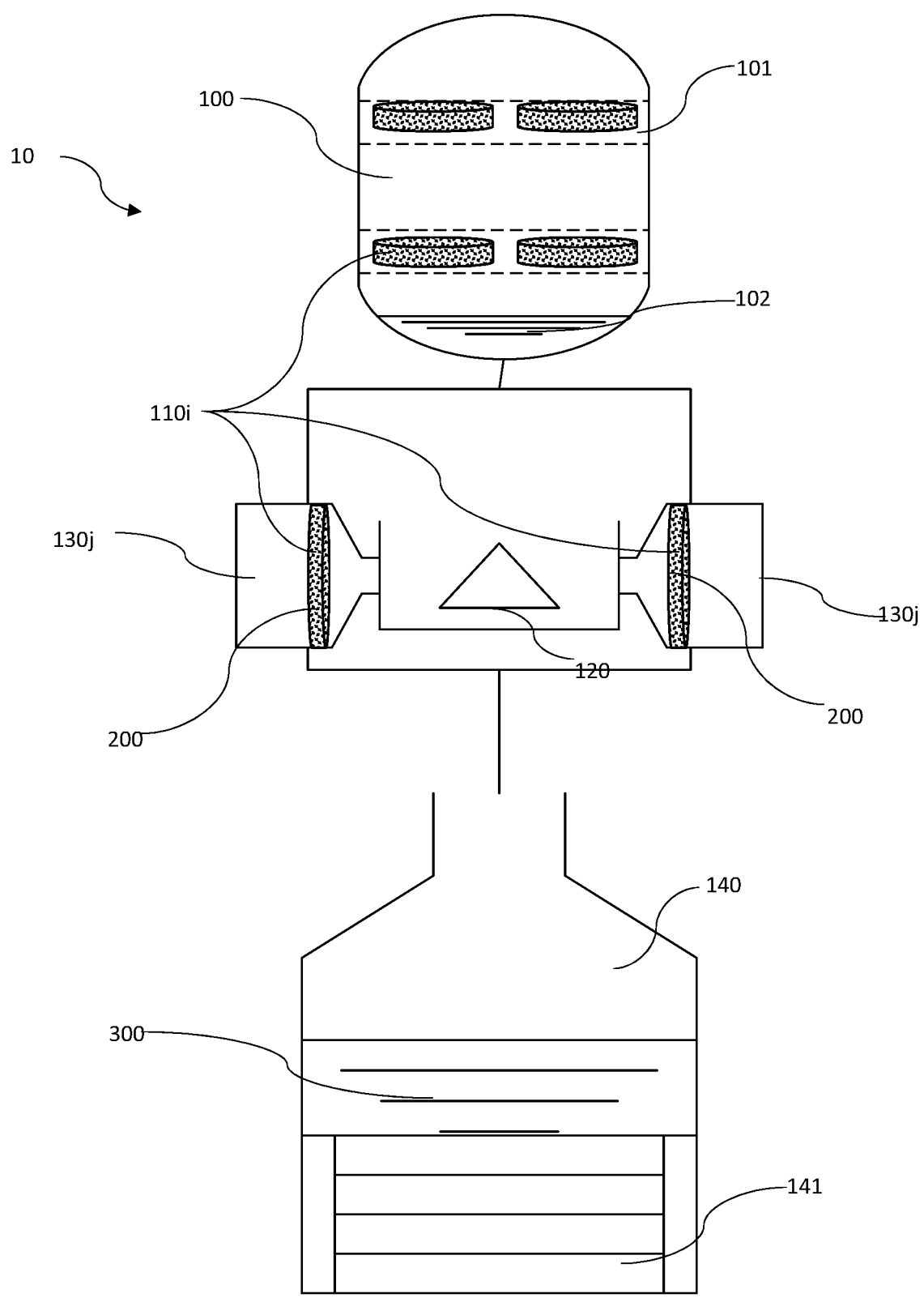
FIG. 1, is a schematic of an exemplary implementation of the system used to implement the methods disclosed.

Accordingly and in an exemplary implementation, and as illustrated schematically in FIG. 1, provided herein is system 10 for nectar harvesting comprising: plurality of flowers 200 having the EFN, extraction chamber 100, at least one substrate 110*i*, extractor 120, and at least one collection chamber 130*j*. The system is configured to operate in a continuous batch operation, meaning a basic unit operation, consisting essentially of the plurality of flowers 200, accommodated within the at least one substrate 110*i* is selectably (e.g., without affecting other system components) transferred between the other components of the system, such as extraction chamber 100, and extractor 120.

The method, implemented in the systems disclosed therefore comprises: collecting the plurality of flowers having the EFN; positioning at least a portion of the collected flowers 200 within the at least one substrate 110*i*; inserting at least one substrate 110*i*, into extraction chamber 100 for a predetermined period, wherein extraction chamber 100 is maintained at an equilibrium relative humidity of between about 75% and about 95% at 25° C.; removing at least one substrate 110*i* from extraction chamber 100; coupling at least one substrate 110*i* to at least one collection chamber 130*j*; coupling at least one collection chamber 130*j* to extractor 120; spinning extractor 120 at a predetermined revolutions per minutes (RPM), configured to extract the nectar from flowers 200; and collecting the nectar in at least one collection chamber 130*j*.

The flowers having the EFN, which nectar is harvested using the methods provided implemented using the systems disclosed, can be, for example, at least one of *Petunia axillaris* (*P. axillaris*), *Petunia exserta* (*P. exserta*), *Mimulus cardinalis* (*M. cardinalis*), *Asclepius syriaca* (*A. syriaca*), *Lobelia cardinalis* (*L. cardinalis*), *Palicourea heterochroma* (*P. heterochroma*), *Symbolanthus calygonus* (*S. calygonus*), *Macrocarpaea noctiluca* (*M. noctiluca*), and *Macrocarpaea arborescens* (*M. arborescens*). As is evident, some of the flowers bloom during the day (e.g., *M. cardinalis, P. exserta*) and some at night (e.g., *M. noctiluca, M. arborescens*). EFN, refers to specialized nectar-secreting plant glands that develop outside of flowers and are not involved in pollination, generally on the leaf or petiole. Likewise, other plants or portions thereof used, can be for example, honeydew melons, peaches, grapes and the like.

In certain exemplary implementations, the nectar production of the stock flowers is increased. For example, prior to the step of collecting the flowers, contacting the flowers with an effective amount of a composition comprising at least one of: Jasmonic Acid (JA), jasmonate isoleucine (JA-Ile), and Coronalone. However, since JA's activity is typically light mediated, when in certain implementations, nocturnally-blooming flowers are used, the increase means in nectar production used can be JA-Ile, and/or Coronalone, but not JA.

Furthermore, prior to, simultaneously with, or following the step of contacting the flowers with JA, JA-Ile, or Coronalone, expression of at least one of: MADS-box gene, MYB-related protein 305, sucrose phosphate synthase, and SWEET9 gene are increased. Increasing the expression of the aforementioned compounds can be done by several methods. These can be, for example, by transgene overexpression through introduction of tissue-specific and inducible promoters. Initiation of transcription can in turn, be mediated by proteins that recognize specific DNA sequences in the promoter, which interact with basic transcription initiation complexes and numerous transcription factors and thereby inducing RNA polymerase activity. These DNA recognition sequences are typically comprised of a core promoter operably coupled to an upstream enhancer sequences located close to the structural portion of the gene, which activates these enhancer sequences. The promoters utilized can be, for example, those obtained from genes specifically expressed in the interior of the lateral first-whorl organs, where nectaries develop.

In the context of the disclosure, the term "promoter" refers to a region of DNA upstream from the translational start codon and which is involved in recognition and binding of RNA polymerase and other proteins to initiate transcription, while the term "operably coupled" or "operably linked" as used herein, refers to linkage of a promoter upstream from a DNA sequence such that the promoter mediates transcription of the DNA sequence.

To facilitate the extraction of nectar from the flowers, extraction chamber 100 is maintained under vacuum, at a pressure of between about 10 KPa and about 97 KPa, or between about 10 KPa and about 75 KPa, for example, between about 10 KPa and about 50 KPa, or between about 10 KPa and about 25 KPa. Other methods of facilitating the extraction of nectar from flowers 200 are also contemplated. These include, for example, electroporation by exposing the flowers to high-voltage (e.g., between about 5 KV and about 15 KV) short pulse (e.g., between about 1-and about 500 ms.). Accordingly and in certain exemplary implementation, extraction chamber 100 is coupled to a vacuum pump 105 (not shown).

In an exemplary implementation, the relative humidity, under which extraction chamber 100 is maintained, is achieved by incorporating within extraction chamber 100 saturated salt solution 102 (meaning a mixture of at least one powdered salt and at least one saturated aqueous solution of salt), the saturated salt solution being operable to provide the predetermined equilibrium relative humidity (ERH, referring to the equilibrium moisture content in the hermetically closed extraction chamber) of between about 75% and about 95% at 25° C. The increased relative humidity creates in certain implementations, a chemical potential between the saturated salt solution and the nectar due to the sugar concentration within the nectar, thus drawing the nectar from the EFN gland. Accordingly, and in an exemplary implementation, the saturated salt solution comprises sodium chloride (NaCl), Potassium Bromide (KBr), Potassium Chloride (KCl), Potassum Nitrite ($KNO_3$), Potassium Sulfide ($K_2SO_4$), or a solution comprising one or more of the foregoing.

Conversely, the step of collecting the nectar in at least one of collection chamber(s) 130*j*, further comprises concentrating the collected nectar to a predetermined sucrose concentration of between about 3% (w/w) and about 80% (w/w), or between about 10% (w/w) and about 75% (w/w), for example, between about 20% (w/w) and about 60% (w/w), or between about 30% (w/w) and about 50% (w/w). Accordingly, concentrating the collected nectar harvested using the methods disclosed and implemented in the systems provided, comprises in an exemplary implementation exposing the nectar to a saturated salt solution, for example, once transferred from at least one of collection chamber(s) 130*j*, to evaporator/concentration chamber 140, operable to dehydrate nectar 300. As illustrated, evaporator/concentration chamber 140 can comprise heat exchanger 141 and be maintained, similar to extraction chamber 100, under vacuum, such that mild heating, for example to temperatures between about 30° C. and about 45° C., will facilitate concentration of nectar 300. Alternatively, or additionally, the saturated salt solution used to concentrate nectar 300 comprises in certain exemplary implementations, Lithium Iodide (LiI), Lithium Chloride (LiCl), Zirconium Bromide ($ZnBr_2$), Lithium Bromide, or a solution comprising one or more of the foregoing. Moreover, the step of concentrating the collected nectar in the methods disclosed, implemented in the systems provided, comprises in an exemplary implementation, exposing nectar 300 to phosphorous pentoxide ($P_2O_5$).

In an exemplary implementation, at least one substrate 110*i* comprises a first netting slab configured to engage a second netting slab, forming a substantially open structure wherein at least a portion of the plurality of flowers are sandwiched between the first and second netting slabs, and at least one substrate 110*i* is adapted, sized and configured to accommodate at least a portion of flowers 200.

Figure 2:
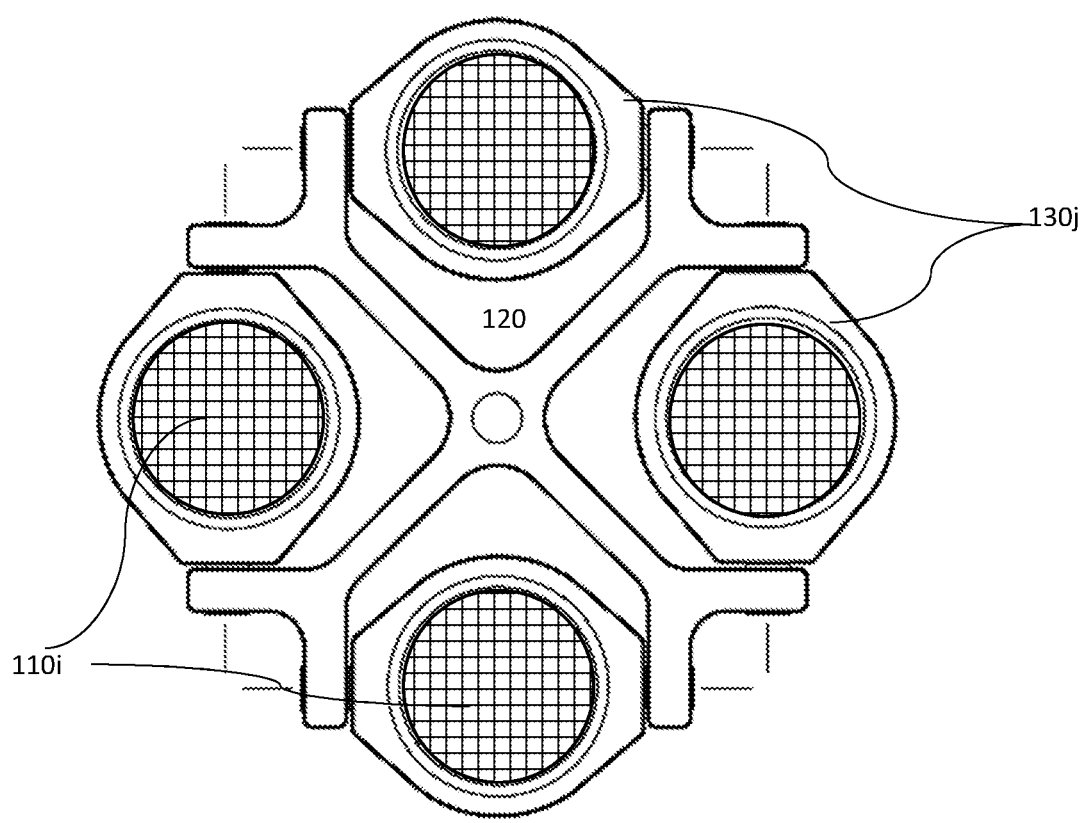
FIG. 2, is a schematic of an exemplary implementation of the extractor included in the system.

Turning now to FIG. 2, illustrating a schematic of an exemplary implementation of the extractor included in the system. The extractor can be, for example, a swinging-head centrifuge. Accordingly, at least one substrate 110*i* is operably coupled to at least one collection chamber 130*j*, in a way that would best facilitate to extraction of nectar 300. For example, arranging flowers 200 such that all stems are directed away from the center of extractor 120.

In an exemplary implementation, the methods disclosed are implemented in the systems disclosed, accordingly, provided herein is a system for harvesting nectar from flowers having EFN, the system comprising extraction chamber 100, at least one substrate 110*i*, extractor 120, and at least one collection chamber 130*j*. The system comprises in another exemplary implementation, vacuum pump 105 (not shown), in communication with extraction chamber 100, operable to maintain sub-atmospheric pressure of between about 10 KPa and about 97 KPa in extraction chamber 100.

The system can further comprise, in certain implementations, a variety of sensors operable to provide indication of the progress of the various processes. These can be, for example, timers, thermocouples, refractometers, load balances, pressure gauges, or a sensor combination comprising one or more of the foregoing. The sensors can be in communication with a central processing module (CPM), comprising at least one processor, the CPM being in communication with a non-volatile memory storage device, storing thereon a computer-readable media with a set of executable instructions, configured when executed to communicate with the various sensors and unit operations (e.g., extraction chamber 100, extractor 120, at least one collection chamber 130j, and evaporator/concentrator chamber 140), valves and carry out the methods disclosed.

In the context of the disclosure, the term "operable" means the system and/or the device (e.g., the nutrient dispensing pump) and/or the program, or a certain element, component or step is/are fully functional sized, adapted and calibrated, comprising elements for, having the proper internal dimension to accommodate, and meets applicable operability requirements to perform a recited function when activated, coupled or implemented, regardless of being powered or not, coupled, implemented, effected, actuated, realized or when an executable program is executed by at least one processor associated with the system, method, and/or the device.

The term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including", "having" and their derivatives.

All ranges disclosed herein are inclusive of the endpoints, and the endpoints are independently combinable with each other. "Combination" is inclusive of blends, mixtures, alloys, reaction products, and the like. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the chamber(s) includes one or more chamber). Reference throughout the specification to "one implementation", "another implementation", "an exemplary implementation,", and so forth, when present, means that a particular element (e.g., feature, structure, and/or characteristic) described in connection with the implementation is included in at least one implementation described herein, and may or may not be present in other implementations. In addition, it is to be understood that the described elements may be combined in any suitable manner in the various implementations.

All ranges disclosed herein are inclusive of the endpoints, and the endpoints are independently combinable with each other. Furthermore, the terms "first," "second," and the like, herein do not denote any order, quantity, or importance, but rather are used to denote one element from another.

Likewise, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. For example, "about" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

Accordingly and in an exemplary implementation, provided herein is a method of extracting nectar from a plant, implemented in a system comprising: a plurality of plants or portions thereof, an extraction chamber, at least one substrate, an extractor, and at least one collection chamber, the method comprising: collecting the plurality of plants or their portions; positioning at least a portion of the collected plants or their portions within the at least one substrate inserting the at least one substrate into the extraction chamber for a predetermined period, wherein the extraction chamber is maintained at an equilibrium relative humidity of between about 75% and about 95% at 25° C.; removing the at least one substrate from the extraction chamber; coupling the at least one substrate to the at least one collection chamber; coupling the collection chamber to the extractor; spinning the extractor at a predetermined revolutions per minutes, configured to extract the nectar from the plants or their portions; and collecting the nectar in the collection chamber, wherein (i) the plants or their portions is a flower having an extrafloral nectarie, whereby the plant is at least one of: *Petunia axillaris* (*P. axillaris*), *Petunia exserta* (*P. exserta*), *Mimulus cardinalis* (*M. cardinalis*), *Asclepius syriaca* (*A. syriaca*), *Lobelia cardinalis* (*L. cardinalis*), *Palicourea heterochroma* (*P. heterochroma*), *Symbolanthus calygonus* (*S. calygonus*), *Macrocarpaea noctiluca* (*M. noctiluca*), and *Macrocarpaea arborescens* (*M. arborescens*), the method further comprising (ii) prior to the step of collecting the flower, contacting the plants or their portions with an effective amount of a composition comprising at least one of: Jasmonic Acid (JA), jasmonate isoleucine (JA-Ile), and Coronalone, wherein (iii) prior to, simultaneously with, or following the step of contacting the plants or their portions with JA, increasing expression of at least one of: MADS-box gene, MYB-related protein 305, sucrose phosphate synthase, and SWEET9 gene, wherein (iv) the extraction chamber is maintained at a pressure of between about 10 KPa and about 97 KPa (in other words, under vacuum of between about 0.1-0.96 Atmospheres ATM), wherein (v) the equilibrium relative humidity (ERH %) is maintained by incorporating within the extraction chamber a (e.g., vessel with) saturated salt solution operable to provide a predetermined relative humidity, (vi) the saturated salt solution comprises sodium chloride (NaCl), Potassium Bromide (KBr), Potassium Chloride (KCl), Potassum Nitrite ($KNO_3$), Potassium Sulfide ($K_2SO_4$), or a solution comprising one or more of the foregoing, wherein (vii) the step of collecting the nectar in the collection chamber, further comprises concentrating the collected nectar to a predetermined sucrose concentration, (viii) comprising exposing the nectar to a saturated salt solution, configured to dehydrate the nectar, wherein (ix) the saturated salt solution comprises Lithium Iodide (LiI), Lithium Chloride (LiCl), Zirconium Bromide ($ZnBr_2$), Lithium Bromide, or a solution comprising one or more of the foregoing, or (x) phosphorous pentoxide ($P_2O_5$), wherein (xi) the substrate comprises a first netting slab configured to engage a second netting slab, wherein at least a portion of the plurality of plants or their portions are sandwiched between the first and second netting slabs, (xii) the at least one substrate is operably coupled the collection chamber, and wherein (xiii) the collection chamber is a swinging head of the extractor.

In another exemplary implementation, provided herein is a system for extracting nectar from a plant or a portion thereof, comprising: a plurality of plants or their portions; an extraction chamber; at least one substrate; an extractor; and at least one collection chamber, wherein (xiv) the extraction chamber is maintained at a pressure of between about 10 KPa and about 97 KPa, and equilibrium relative humidity of between about 75% and about 95%, the system further comprising (xv) a vacuum pump operably coupled to the extraction chamber, wherein (xvi) the substrate comprises a first netting slab configured to engage a second netting slab, wherein at least a portion of the plurality of plants or their portions are sandwiched between the first and second netting slabs, (xvii) the at least one substrate is operably coupled the collection chamber, and wherein (xviii) the collection chamber is a swinging head of the extractor.

Although the foregoing disclosure for systems, compositions and methods for semi-continuously harvesting nectar from flowers having extrafloral nectaries (EFN), as well as other plant sources, as well as other plant sources with augmented nectar production has been described in terms of some implementations, other implementations will be apparent to those of ordinary skill in the art from the disclosure herein. Moreover, the described implementations have been presented by way of example only, and are not intended to limit the scope of the inventions. Indeed, the novel methods, programs, libraries and systems described herein may be embodied in a variety of other forms without departing from the spirit thereof. Accordingly, other combinations, omissions, substitutions and modifications will be apparent to the skilled artisan in view of the disclosure herein.

What is claimed:

1. A method of extracting nectar from a plant, implemented in a system comprising: a plurality of plants or portions thereof, an extraction chamber, at least one substrate, an extractor, and at least one collection chamber, the method comprising:
   a) collecting the plurality of plants or their portions;
   b) positioning at least a portion of the collected plants or their portions within the at least one substrate
   c) inserting the at least one substrate into the extraction chamber for a predetermined period, wherein the extraction chamber is maintained at an equilibrium relative humidity of between about 75% and about 95% at 25° C.;
   d) removing the at least one substrate from the extraction chamber;
   e) coupling the at least one substrate to the at least one collection chamber;
   f) coupling the collection chamber to the extractor;
   g) spinning the extractor at a predetermined revolutions per minutes, configured to extract the nectar from the plants or their portions; and
   h) collecting the nectar in the collection chamber.

2. The method of claim 1, wherein the plants or their portions is a flower having an extrafloral nectarie that is at least one of: *Petunia axillaris* (*P. axillaris*), *Petunia exserta* (*P. exserta*), *Mimulus cardinalis* (*M. cardinalis*), *Asclepius syriaca* (*A. syriaca*), *Lobelia cardinalis* (*L. cardinalis*), *Palicourea heterochroma* (*P. heterochroma*), *Symbolanthus calygonus* (*S. calygonus*), *Macrocarpaea noctiluca* (*M. noctiluca*), and *Macrocarpaea arborescens* (*M. arborescens*).

3. The method of claim 2, further comprising, prior to the step of collecting the flower, contacting the plants or their portions with an effective amount of a composition comprising at least one of: Jasmonic Acid (JA), jasmonate isoleucine (JA-Ile), and Coronalone.

4. The method of claim 3, wherein prior to, simultaneously with, or following the step of contacting the plants or their portions with JA, increasing expression of at least one of: MADS-box gene, MYB-related protein 305, sucrose phosphate synthase, and SWEET9 gene.

5. The method of claim 1, wherein the extraction chamber is maintained at a pressure of between about 10 KPa and about 97 KPa.

6. The method of claim 5, wherein the relative humidity is maintained by incorporating within the extraction chamber a saturated salt solution operable to provide a predetermined relative humidity.

7. The method of claim 6, wherein the saturated salt solution comprises sodium chloride (NaCl), potassium bromide (KBr), potassium chloride (KCl), potassum nitrite ($KNO_3$), potassium sulfide ($K_2SO_4$), or a solution comprising one or more of the foregoing.

8. The method of claim 1, wherein the step of collecting the nectar in the collection chamber, further comprises concentrating the collected nectar to a predetermined sucrose concentration.

9. The method of claim 8, wherein the step of concentrating the collected nectar comprises exposing the nectar to a saturated salt solution, configured to dehydrate the nectar.

10. The method of claim 9, wherein the saturated salt solution comprises lithium iodide (LiI), lithium chloride (LiCl), zirconium bromide ($ZnBr_2$), lithium bromide, or a solution comprising one or more of the foregoing.

11. The method of claim 8, wherein the step of concentrating the collected nectar comprises exposing the nectar to phosphorous pentoxide ($P_2O_5$).

12. The method of claim 1, wherein the substrate comprises a first netting slab configured to engage a second netting slab, wherein at least a portion of the plurality of plants or their portions are sandwiched between the first and second netting slabs.

13. The method of claim 12, wherein the at least one substrate is operably coupled to the collection chamber.

14. The method of claim 13, wherein the collection chamber is a swinging head of the extractor.

15. A system for extracting nectar from a plant or a portion thereof, comprising:
   a) a plurality of plants or their portions;
   b) an extraction chamber;
   c) at least one substrate;
   d) an extractor; and
   e) at least one collection chamber.

16. The system of claim 15, wherein the extraction chamber is maintained at a pressure of between about 10 KPa and about 97 KPa, and equilibrium relative humidity of between about 75% and about 95%.

17. The system of claim 15, further comprises a vacuum pump operably coupled to the extraction chamber.

18. The system of claim 15, wherein the substrate comprises a first netting slab configured to engage a second netting slab, wherein at least a portion of the plurality of plants or their portions are sandwiched between the first and second netting slabs.

19. The system of claim 15, wherein the at least one substrate is operably coupled to the collection chamber.

20. The system of claim 19, wherein the collection chamber is a swinging head of the extractor.

* * * * *